Figure 1:
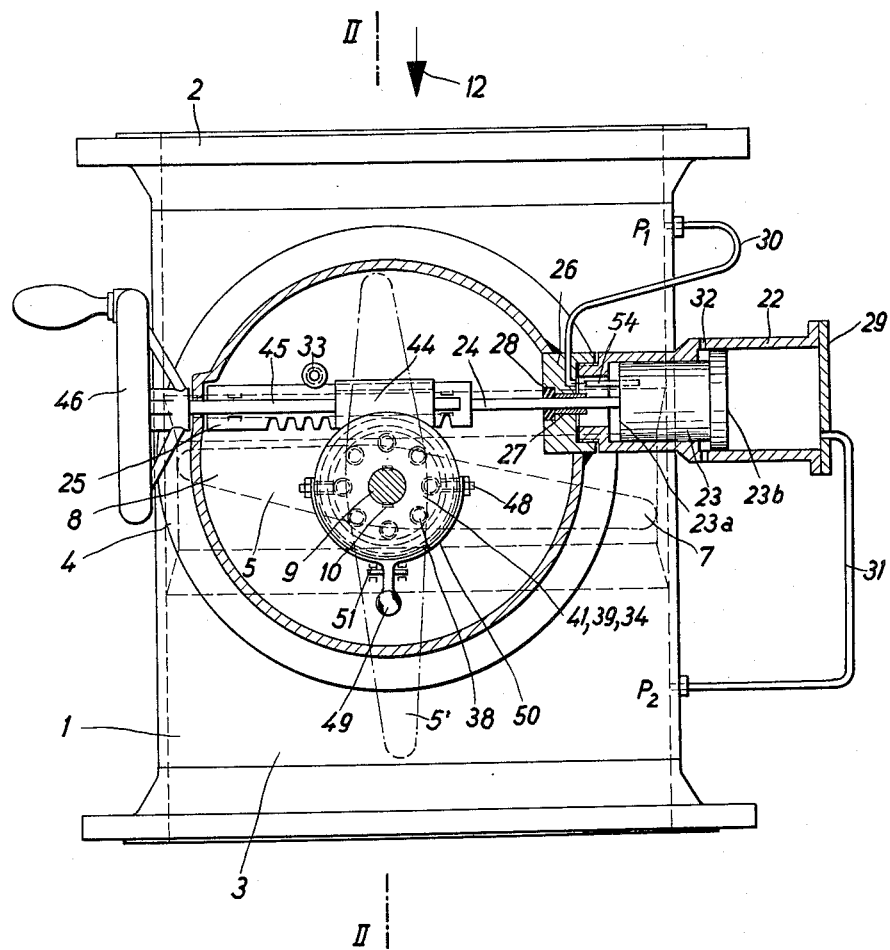

Nov. 7, 1961 K. ADAMS 3,007,487
VALVE
Filed April 21, 1959 2 Sheets-Sheet 1

Inventor:
Karl Adams
BY Michael S. Striker
Attorney

United States Patent Office 3,007,487
Patented Nov. 7, 1961

3,007,487
VALVE
Karl Adams, Im Pastoratsbusch 102, Boghum, Germany
Filed Apr. 21, 1959, Ser. No. 807,953
Claims priority, application Germany Apr. 21, 1958
5 Claims. (Cl. 137—495)

The invention relates to valves and more particularly to a vane-type valve suitable as a check valve in pipe lines of large internal diameter such as the pipe lines of public water supply systems, but also useful as a shut-off valve.

Valves for pipe lines carrying large volumes of liquid at relatively low pressure present specific problems. They should close rapidly and securely, but cannot be permitted to cause shock waves in the column of liquid the flow of which is being interrupted. They also should be of simple and rugged construction to permit long uninterrupted service without maintenance under the conditions of water supply operation.

It is, therefore, a primary object of the invention to provide a check valve suitable for operation in pipe lines of large diameter.

Another object is the provision of such a check valve which opens and closes rapidly and completely.

Yet another object is to provide a check valve which is capable of closing smoothly without causing water hammer, or a shock wave, to be generated in a column of liquid, the flow of which is being interrupted.

An additional object is the provision of a check valve adapted to achieve the objects enumerated above and suitable simultaneously to act as a shut-off valve.

A further object is to provide a valve which is simple and rugged in its construction and capable of maintenance-free operation over an extended period of time.

With these and other objects in view, the invention provides a valve arrangement including a valve housing formed with a passage for flow of a fluid therethrough, and a valve member mounted in the housing for movement toward and away from a position in which the valve member obstructs the passage in the valve housing and separates two portions of the passage from each other. Furthermore, cylinder means are provided together with double-acting piston means reciprocably movable in the cylinder means and having two faces extending transversely of the direction of movement of the piston means in the cylinder means so as to define two respective spaces in the cylinder means.

Two conduits respectively communicate with one of the afore-mentioned portions of the passage in the valve housing and with one of the piston-defined spaces in the cylinder means. This arrangement causes the pressures prevailing in the two portions of the housing passage to be transmitted to the spaces in the cylinder means for actuating movement of the double-acting piston means. Connecting means are provided and are engageable with the piston means and the valve member for actuating movement of the latter responsive to the pressures prevailing in the passage portions.

Figure 2:
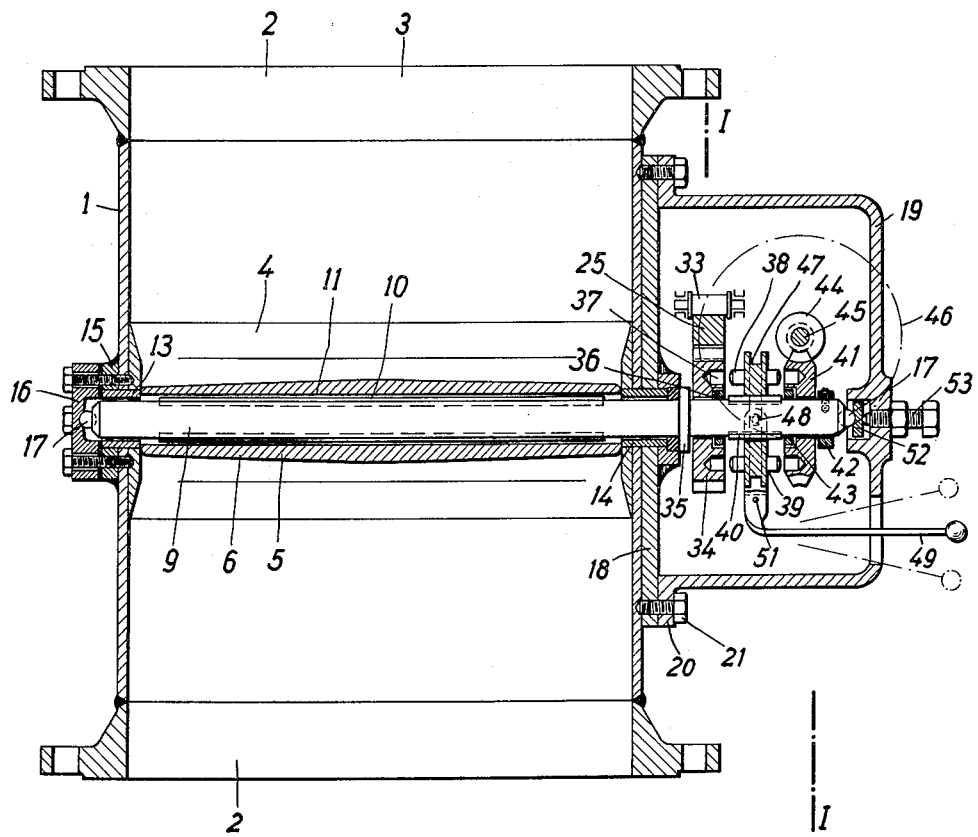

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevational sectional view of a preferred embodiment of the invention, the section being taken along the line I—I of FIG. 2; and FIG. 2 is a front elevational sectional view of the device of FIG. 1 taken on the line II—II of FIG. 1.

Referring now to the drawing, there is shown a short length of cylindrical pipe 1 provided with welding flanges 2 at the two open ends thereof. The pipe length 1 together with the flanges 2 constitutes the housing of the valve through which a fluid the flow of which is to be controlled by the valve may pass in an axial direction. A tubular sleeve 4 coaxial with the pipe 1 and circumferentially attached thereto forms an area of restricted cross section in the pipe 1 intermediate the ends thereof. The bore of the sleeve 4 tapers inwardly from the orifices of the sleeve.

A vane 5 is movably arranged in the passage formed by the pipe 1 and the sleeve 4 and is adapted to seal the passage when positioned in a plane slightly inclined relative to a perpendicularly transverse plane in the passage of the pipe 1, as indicated by the broken lines in FIG. 1. When the vane is in the open position indicated at 5' by a line of alternate dots and dashes it interferes but very little with the flow of fluid through the passage because of its shape.

The vane 5 includes a hub portion 6 from which a longer wing portion 7 and a shorter wing portion 8 extend in opposite directions and taper in thickness in a direction away from the hub portion 6 toward rounded edges which cooperate with the sleeve 4 in such a manner as to form a substantially tight seal and to prevent rotation of the vane 5 through more than one half turn. In all positions of the vane 5, the longer wing portion 7 is axially displaced in a downstream direction from the shorter wing portion 8.

The vane 5 is mounted in the valve housing 3 by means of a shaft 9 on which it is fixedly fastened by means of keys 10 engaging corresponding keyways 11 in the hub portion 6. The shaft 9 is passing through the vane 5 along an eccentric line so that flow of fluid through the valve housing 3 in the direction of arrow 12 tends to keep the valve open.

As best seen from FIG. 2, the shaft 9 is rotatedly mounted in the pipe 1 by means of bearing bushings 13 and 14 fixedly secured in the pipe 1 and extending into openings of the sleeve 4 so as to hold the latter in an axially fixed position in the valve housing 3. The bearing bushing 13 has a reinforcing flange 15 welded thereto and to the outside of the pipe 1. A bearing cover 16 is bolted to the flange 15 and is formed with a central depressing serving as a seat for a bearing ball 17 interposed between the cover 16 and one of the transverse end faces of the shaft 9.

The bearing bushing 14 extends outwardly from the pipe 1 through a mating opening in a cylindrically arcuate bottom member 18 of a housing 19. The curvature of the bottom member 18 is the same as that of the pipe 1 and the bottom member 18 extends over a curved circular portion of the outer surface of pipe 1 to which it is fastened. The housing 19 has a substantially circular cross section and is arranged eccentrically about an end portion of the shaft 9 which projects from the pipe 1 through the bearing bushing 14. The housing 19 is secured to the bottom member 18 by means of bolts 21 passing through a flange portion of the housing.

A cylinder 22 having a stepped cylindrical bore is secured to the valve. It encloses a differential double-acting piston 23 which has a piston face 23a of smaller effective surface area in the portion of the cylinder 22 of smaller cross sectional area, and a larger piston face 23b in the portion of the cylinder 22 of larger cross sectional area. The piston 23 is reciprocally movable in the cylinder 22 and transmits its movement by means of a piston rod 24 to a rack 25.

The piston rod 24 passes through a guide sleeve 27 in a cylinder head 26 which is attached by welding to the housing 19. The cylinder 22 is threadedly secured to the cylinder head 26. To insure passage of the piston rod 24 through the cylinder head 26 without leakage, a sealing washer 28 is arranged adjacent the guide sleeve 27.

While the cylinder head 26 provides a transverse wall for the cylinder space of small cross sectional area opposite the piston face 23a, the cylinder space of larger diameter is closed by a flanged cover 29 opposite the piston face 23b. The cylinder spaces are respectively connected with the passage in the valve housing 3 by means of conduits 30 and 31 made of small diameter tubing. The conduits transmit the pressures prevailing in the valve housing at points $P_1$ and $P_2$, that is upstream and downstream of the vane 5 to the respective cylinder spaces. Relief vents 32 in the cylinder 22 permit escape of any liquid leaking past the cylindrical interface between the piston 23 and the cylinder 22.

Movement of the rack 25 is guided by a flanged guide wheel 33 rotatably mounted in the housing 19 and guiding the rack into engagement with a pinion 34 which is mounted on the shaft 9, as best seen in FIG. 2. The pinion 34 is freely rotatable on the shaft 9 and is axially secured thereon by two collars 35 and 36, collar 36 engaging a corresponding recess in the pinion 34. The pinion 34 is provided with eight equiangularly spaced concentric axial recesses 37 for engaging correspondingly-arranged entraining pins 38 on a circular disc 39. The disc 39 is axially slidable on the shaft 9 and is secured thereon against rotation by means of keys 40.

The pins 38 project axially from both circular faces of the disc 39 for alternate engagement of the disc with either the pinion 34 or a worm wheel 41 which is freely rotatable on the shaft 9 and is held in a fixed axial position by collars 42 and 43 in the same manner as the pinion 34. The worm wheel 41 cooperates with a worm 44 with which it forms a self-locking worm gear. The worm 44 is fixedly fastened on a shaft 45 which is rotatably mounted in the housing 19 and has a free end projecting outwardly from the housing 19 and a handwheel 46 mounted on the free end.

The axial position of the circular disc 39 is adjustable by means of an arrangement which includes an annular groove 47 in the cylindrical surface of the disc 39 and radial pins 48 slidably engaging the groove 47. Axial movement of the pins 48, and thereby of the disc 39, is actuated by a shifting lever 49 fixedly secured to a resilient forked member 50 which is pivotally mounted on the housing 19 by means of a pivot pin 51. The free ends of the two arms of the forked member 50 carry the pins 48. The forked member is so dimensioned that it is under resilient stress when the disc 39 is in the neutral position, that is, out of engagement with both the pinion 34 and the worm wheel 39. The resilient force of forked member 50 urges shifting of the wheel into engagement with either one of pinion 34 and worm wheel 41 with which the disc forms a clutch. The positions of the shifting lever 49 in the relaxed condition of the forked member 50 are schematically indicated in FIG. 2 by lines of dots and dashes. The fully drawn position of the shifting lever 49 corresponds to a metastable condition of the shifting arrangement.

The axial position of the shaft 9 is adjustable for minimum friction by means of a thrust block 52 axially adjustable by an adjusting screw 53. The screw 53 is threaded into a mating opening of the housing 19 and is capable of being arrested in the adjusted position by means of a lock nut. The thrust block 52 has a central depression which forms a seat for the bearing ball 17 which is similarly seated in an axial depression in the opposite end face of the shaft 9.

As best seen in FIG. 1, the smaller face 23a of the piston 23 carries a pin 54 which axially extends therefrom and has a conically-tapered end aligned with the orifice of the conduit 30 in the cylinder head 26. When the piston 23 is in its terminal position during its leftward movement as seen in FIG. 1, the pin 54 partially plugs the orifice of the conduit 30.

The afore-described valve operates as follows:

When it is desired to move the vane 5 from its closed position toward the open position indicated at 5' in FIG. 1, the shifting lever 49 is moved into its lower position as shown in FIG. 2, and the disc 39 is engaged with the worm wheel 41. Because of the self-locking feature of the worm gear formed by the wheel 41 and the worm 44, the vane 5 is now arrested in its closed position. Rotation of the hand wheel 46 causes the valve to open until it reaches its wide open position when the vane is at 5'. If the valve is to be operated as a shut-off valve only, the shifting lever 49 is left in its lower position and the vane is locked by the worm gear in its open position 5'.

When it is desired that the valve operate as a check valve, that is, that it open when the pressure $P_1$ is greater than the pressure $P_2$, the shifting lever is moved into its upper position, and the entraining pins 38 are engaged with the axial recesses 37 for joint movement of the circular disc 39 with the pinion 34. Transmission of the pressures $P_1$, $P_2$ through the conduits 30 and 31 to the spaces of the cylinder 22 will cause movement of the piston 23 to the right, as viewed in FIG. 1, when the pressure $P_1$ which acts upon the smaller piston face 23a exerts a greater force than the pressure $P_2$ acting on the larger piston face 23b. Movement of the piston 23 toward the right is joined by the piston rod 24 and the rack 25 which rotates the pinion 24, and thereby the shaft 9 with the vane 5 in a counterclockwise direction.

The ratio of the pressures $P_1$ and $P_2$ decreases as the valve opens but it can never reach a value of 1, as long as fluid flows in the direction of the arrow 12, because of the resistance offered to the flow of the fluid by the sleeve 4 and the vane 5. When the valve is fully open, the forces acting on the piston faces 23a and 23b are, therefore, approximately equal. Opening of the valve, however, is favored by the eccentric location of the shaft 9 in the vane 5.

When flow of fluid through the valve housing 3 completely subsides and the pressure $P_1$ becomes equal to the pressure $P_2$, the force exerted on the piston face 23b is slightly greater than that exerted in the opposite direction on the piston face 23a, and the valve slowly closes.

If the pressure $P_2$ becomes greater than pressure $P_1$, that is, in the event of backward flow through the housing 3 contrary to the arrow 12, the valve 5 is closed rapidly. This closing movement is not only actuated by the greater force of the greater pressure acting on the larger piston face 23b, but also by the rotary moment caused by backward flow against the larger wing portion 7 of the vane 5.

The combined forces urging the vane 5 into the closed position increase during the closing operation. Still, the vane cannot close so rapidly as to cause a shock wave and water hammer to be created in a column of liquid the flow of which is interrupted. During the terminal stage of the above closing process, the differential piston 23 acts as a brake upon the movement of the vane 5 under the rotary force exerted by the longer wing portion 7. The conduits 30 and 31 are of such a small cross section that they have a throttling effect on the flow of fluid into or out of the cylinder 22 at a high speed of vane movement. It will be readily understood by those skilled in the art that the same throttling effect may be achieved without departing from the spirit of the present invention by making the conduits 30 and 31 of relatively large diameter and by arranging a throttling valve of either fixed or adjustable throat opening in at least one of the conduits.

The final phase of vane motion during the closing stroke of the valve is furthermore braked by the engagement of the pin 54 with the orifice of the conduit 30 which is partially plugged by the pin as the piston 23 approaches the extreme position on its leftward stroke, as viewed in FIG. 1. The braking effect is thus enhanced at the moment at which it is most critically required to ensure smooth and gradual closing of the valve. It will be obvious that the very simple pin arrangement illustrated may be replaced by any other valve means gradually obstructing fluid flow through the conduit 30 as the piston 23 approaches the end of its valve-closing stroke.

It will be understood that each of the elements described above, or two or more together, may also find a useful application in other types of valves differing from the types described above.

While the invention has been illustrated and described as embodied in vane-type valve, it is not intended to be limited to the details shown, since various modifications and structural changes may be made without departing in any way from the spirit of the present invention.

As the piston 23 with separate drive of the valve must not in all cases be decoupled the pinion 34 may be rigidly connected to the pin of the shaft 9. Then only a detachable coupling of the worm wheel 41 is necessary. When operating the valve 5 by the worm gear also the piston 23 is then moved, which however is not disadvantageous.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a check valve, in combination, a valve housing formed with a passage for flow of fluid therethrough; a butterfly valve member mounted in said housing for turning movement about an axis eccentric to said passage and between an open position and a closed position separating two portions of said passage from each other, fluid flowing through said passage in one direction tending to open said butterfly valve member, and fluid flowing in the opposite direction tending to close said butterfly valve member; a cylinder; a differential double-acting piston movably mounted in said cylinder and having a smaller piston face defining a first chamber, and a larger piston face defining a second chamber in said cylinder, said first chamber communicating with the portion of said passage located upstream, and said second chamber communicating with the portion of said passage located downstream when the fluid flows in said one direction so that a small pressure differential will be compensated on said piston during flow of fluid in said one direction, while flow of fluid in said opposite direction will simultaneously actuate said piston and tend to move said butterfly valve member to said closed position; connecting means connecting said piston with said butterfly valve member so that said butterfly valve member moves to said closed position when said piston is actuated by fluid flowing in said opposite direction; and operating means operatively connected to said butterfly valve member for moving the same between said open and closed positions independently of the hydraulic forces tending to actuate said butterfly valve member, and including means for disconnecting said operating means from said butterfly valve member.

2. In a check valve, in combination, a valve housing formed with a passage for flow of fluid therethrough; a butterfly valve member mounted in said housing for turning movement about an axis eccentric to said passage and between an open position and a closed position separating two portions of said passage from each other, fluid flowing through said passage in one direction tending to open said butterfly valve member, and fluid flowing in the opposite direction tending to close said butterfly valve member; a cylinder; a differential double-acting piston movably mounted in said cylinder and having a smaller piston face defining a first chamber, and a larger piston face defining a second chamber in said cylinder, a first throttling conduit connecting said first chamber with the portion of said passage located upstream, and a second throttling conduit connecting said second chamber with the portion of said passage located downstream when the fluid flows in said one direction so that a small pressure differential will be compensated on said piston during flow of fluid in said one direction, while flow of fluid in said opposite direction will simultaneously actuate said piston and tend to move said butterfly valve member to said closed position; throttling means on said piston located in said first chamber and closing said first throttling conduit when said piston is actuated by flow of fluid in said opposite direction to approach the respective terminal position thereof; connecting means connecting said piston with said butterfly valve member so that said butterfly valve member moves to said closed position when said piston is actuated by fluid flowing in said opposite direction; and operating means operatively connected to said butterfly valve member for moving the same between said open and closed positions independently of the hydraulic forces tending to actuate said butterfly valve member, and including means for disconnecting said operating means from said butterfly valve member.

3. A check valve as set forth in claim 2, said operating means including manually operated means for moving said butterfly valve member between said open and closed positions.

4. A check valve as set forth in claim 3 wherein said connecting means include a rack bar fixedly connected to said piston, and a gear connected to said butterfly valve member for rotation and meshing with said rack bar.

5. A check valve as set forth in claim 2 wherein said operating means includes a manually turnable member, a worm screw connected to said manually turnable member for rotation therewith, a worm gear meshing with said worm screw, said disconnecting means being movable between a coupling position and a disconnecting position, said disconnecting means being operatively connected to said butterfly valve member so that the same can be turned by said manually operated member in said coupling position of said disconnecting means References Cited in the file of this patent

UNITED STATES PATENTS

| | | |
|---|---|---|
| 1,681,762 | Connet | Aug. 21, 1928 |
| 1,967,981 | Thomas | July 24, 1934 |
| 2,390,882 | Hopkins | Dec. 11, 1945 |
| 2,882,869 | Krapf | Apr. 21, 1959 |

FOREIGN PATENTS

| | | |
|---|---|---|
| 3,326 | Great Britain | Sept. 23, 1875 |